United States Patent [19]
Miyata

[11] 4,010,402
[45] Mar. 1, 1977

[54] LOAD PROTECTIVE CIRCUIT
[75] Inventor: Toshihiko Miyata, Tokyo, Japan
[73] Assignee: Sony Corporation, Tokyo, Japan
[22] Filed: May 15, 1975
[21] Appl. No.: 577,950
[30] Foreign Application Priority Data
  May 21, 1974 Japan ............ 49-57749[U]
[52] U.S. Cl. ............ 361/56; 330/207 P; 361/88
[51] Int. Cl.² ............ H02H 7/20
[58] Field of Search ............ 317/16, 31, 33 R; 330/207 P; 307/202 R

[56] References Cited
UNITED STATES PATENTS

| | | | |
|---|---|---|---|
| 3,544,720 | 12/1970 | Corderman | 330/207 P X |
| 3,555,358 | 1/1971 | Gibbs | 317/16 |
| 3,659,218 | 4/1972 | Haneda | 330/207 P |
| 3,691,427 | 9/1972 | Honda et al. | 317/33 R X |
| 3,731,153 | 5/1973 | Nishimoto | 330/207 P X |
| 3,814,988 | 6/1974 | Ito | 330/207 P X |
| 3,912,981 | 10/1975 | Tsurushima | 330/207 P X |

Primary Examiner—J D Miller
Assistant Examiner—Patrick R. Salce
Attorney, Agent, or Firm—Hill, Gross, Simpson, Van Santen, Steadman, Chiara & Simpson

[57] ABSTRACT

A load protective circuit having a class B amplifying stage driven by a class A amplifier and a load DC coupled to the class B stage, in which means are provided for detecting an undesirable DC voltage at the output of the class B amplifying stage and for producing a control signal in response to the output of the detecting means. A first protective means shunts the input signal to the class B amplifier to ground in response to the control signal. A second protective means controls a switching means connected between the output point and ground so as to connect the output point of the class B amplifier to ground in response to the control signal to thereby remove any undesirable DC voltage from the output point of the amplifier and to protect the DC coupled load from being damaged.

8 Claims, 5 Drawing Figures

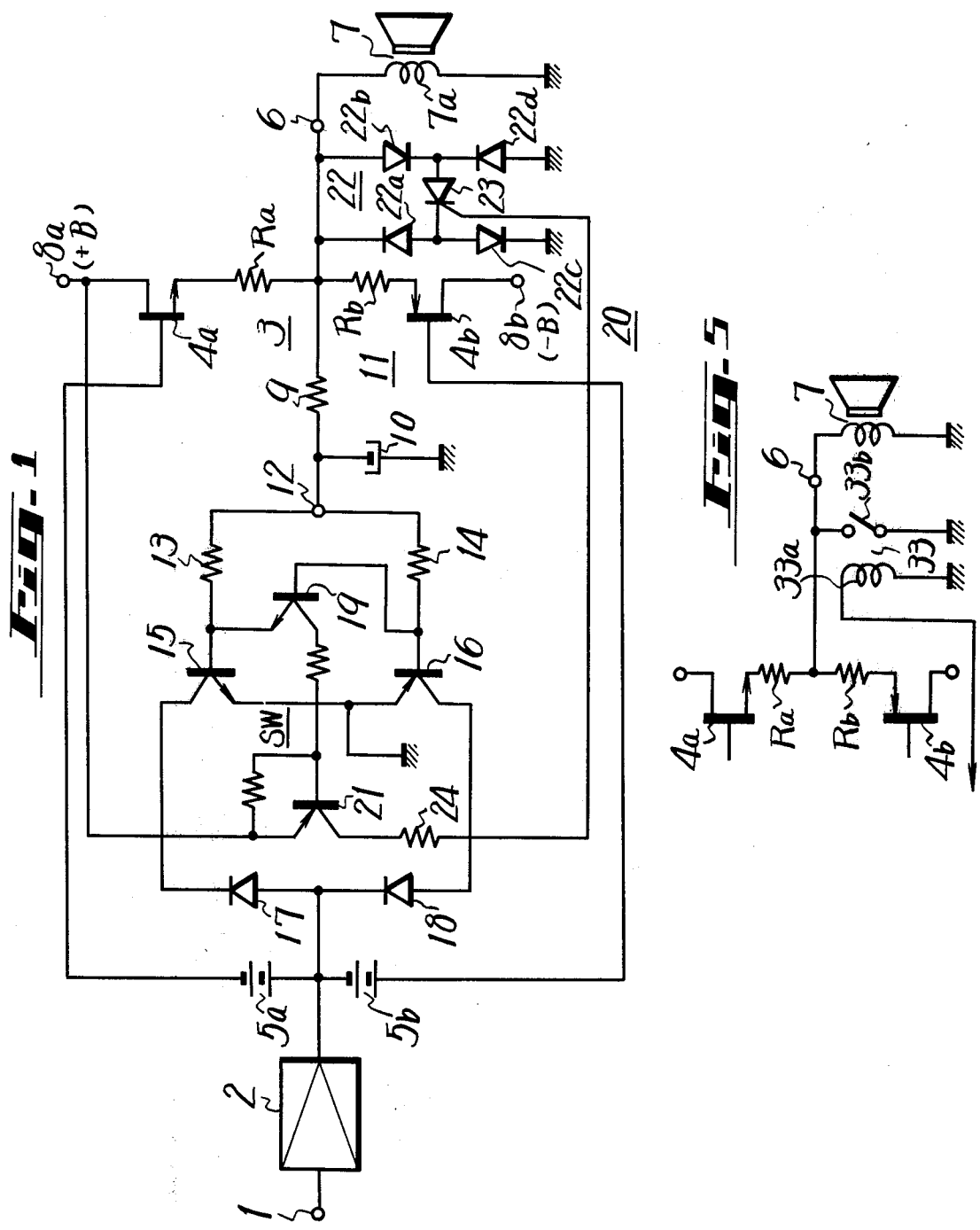

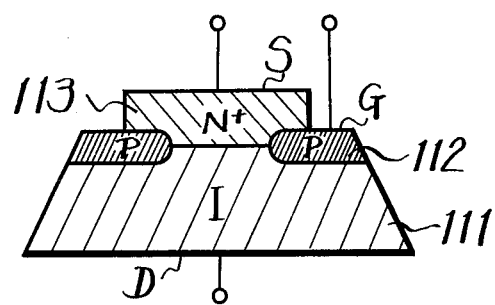
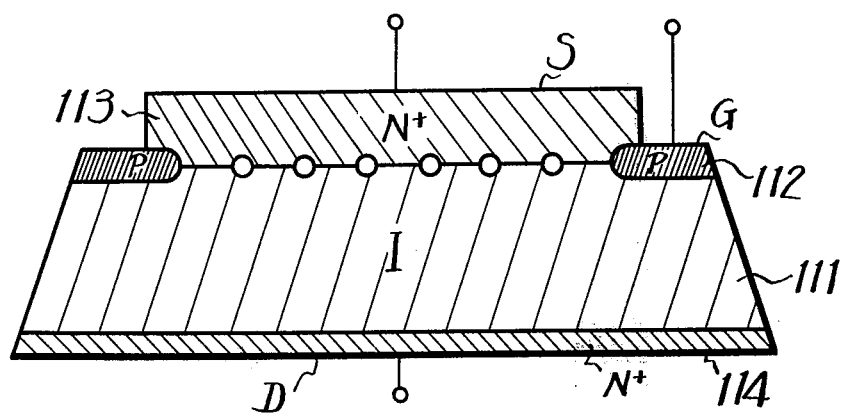
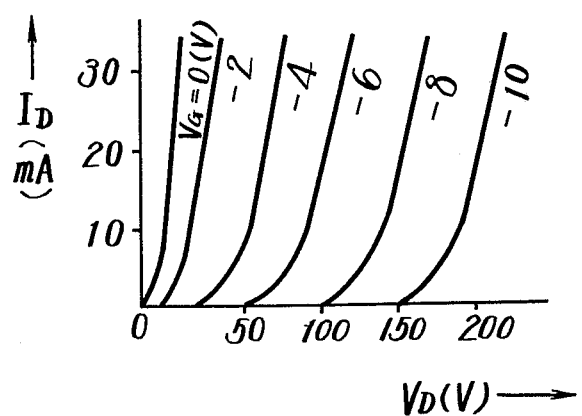

LOAD PROTECTIVE CIRCUIT

BACKGROUND OF THE INVENTION

1. Field of the Invention

This invention relates in general to a protective circuit for a load and in particular to a protective circuit for a load which is coupled to a push-pull amplifier supplied with power voltages from separate voltage sources.

2. Description of the Prior Art

Conventional amplifiers utilized in audio systems not using output transformers have a single-ended push-pull amplifier utilizing pairs of transistors in the last stage which are connected in series to a power source. An output signal is supplied to a speaker from the amplifier through a capacitor of relatively large capacitance. Such capacitors between the output of the amplifier and the speaker prevent DC bias voltage from being applied to the speaker. However, when the frequency of an audio signal is low, the signal may be substantially attenuated by the coupling capacitor and thus the low frequency components of the signal may be substantially attenuated and will not be reproduced by the speaker. It has been proposed in the art to avoid this disadvantage of the coupling capacitor by using a two-source system in which the transistors of the last stage are connected in series to each other and are respectively supplied with positive and negative voltages. This allows the connection point of the transistors to be held at substantially ground potential and the speaker is directly connected between the output terminals of the transistors and the ground. Thus, in such an arrangement, both sides of the speaker are at the same DC potential, so that the speaker is driven directly with the output of the amplifier without receiving any DC bias voltage and is capable of producing signals of very low frequency.

However, with such an amplifier there may be a fear that an abnormal voltage such as a DC voltage or the like appears at the output terminal of the amplifier to damage the speaker. To avoid this, it is desirable to provide a detecting circuit which may detect a DC potential between the final stage amplifier and the speaker. A protective circuit may be provided at the input terminal of the speaker which is operated with the output of the detecting circuit. By way of example, a DC voltage is provided by a resistor and a capacitor connected between the output transistor and the speaker and a relay or SCR (semi-conductor controlled rectifier) is driven by the DC voltage.

In general, however, troubles with amplifiers are frequently caused by class A amplifying stage failures and therefore both the output stage or class B amplifying stage and the drive stage or class A amplifying stage of the amplifier must be considered when designing protection circuits. The speaker must be protected positively even if the class A amplifying stage becomes inoperative.

SUMMARY OF THE INVENTION

According to an aspect of the present invention, there is provided a protective circuit for a single-ended push-pull amplifier which is directly connected to a speaker in which the DC level at the output point of the amplifier is detected and utilized to control two protective means, one of which is connected to an input circuit of the amplifier and the other of which is connected to the output point of the amplifier, so as to protect the speaker positively.

It is an object of this invention to provide an amplifier which is directly connected to a load and which includes two protective circuits for preventing any injury to the load.

Another object of this invention is to provide a single-ended push-pull amplifier in combination with an improved load protective circuit.

A further object of this invention is to provide a single-ended push-pull amplifier having a first protective means which may detect an unbalance at the output point caused by the unbalance of a signal applied to the amplifier and mute the amplifier's input signal, and to provide a second protective means which may shunt the output point to ground when a DC potential appears at the amplifier even if the first protective circuit operates, to thereby positively protect a load such as a speaker.

The other objects, features and advantages of the invention will become clear from the following description taken in conjunction with the accompanying drawings.

BRIEF DESCRIPTION OF THE DRAWINGS

FIG. 1 is a circuit diagram showing an embodiment of the protective circuit according to this invention;

FIG. 2 is a cross-sectional view illustrating an FET used in one embodiment of the protective circuit of the invention;

FIG. 3 is a cross-sectional view illustrating a second embodiment of the FET which may be used in the circuit of the invention;

FIG. 4 is a graphical representation of the dynamic characteristics of the FET shown in FIGS. 2 or 3; and FIG. 5 is a circuit diagram showing the main part of another embodiment of the protective circuit of the invention.

DESCRIPTION OF THE PREFERRED EMBODIMENTS

FIG. 1 shows an embodiment of the protective circuit according to the invention. In the figure, reference numeral 1 designates an input terminal to which a signal is supplied, 2 a driving stage or class A amplifying stage and 3 an output stage. The class A amplifying stage 2 functions as an input circuit, and the class B amplifying stage comprises a pair of transistors 4a and 4b. In the preferred embodiment of this invention, the pair of transistors 4a and 4b are field effect transistors (FETs), preferably vertical junction FETs having triode-type dynamic characteristics.

An embodiment of the FETs, used as the amplifying elements in the invention, are shown in FIG. 2. The FET shown in FIG. 2 is a vertical junction structure formed of an intrinsic semiconductor region 111 having low impurity concentration and high resistance, a P-type semiconductor region 112 having an annular configuration and formed on the upper portion of the intrinsic region 111, and a second-type, for example, an N-type semiconductor region 113 having high impurity concentration formed over both the annular P-type region 112 and the intrinsic region 111, as shown. Respective drain (D), gate (G) and source (S) electrodes are provided at the lower surface of the intrinsic region 111, an exposed portion of the first-type (P-type) annular region 112, and the upper surface of the second-type (N-type) region 113, respectively.

The vertical junction FET depicted in FIG. 2 exhibits triode-type dynamic characteristics. A preferred embodiment of such an FET is depicted in FIG. 3 wherein like reference numerals identify corresponding elements. As is apparent, the FIG. 3 embodiment closely resembles the FIG. 2 embodiment of the FET except that the first-type (P-type) annular region 112 is modified to form a mesh-type structure as shown. Accordingly, the high impurity concentration second-type (N-type) region 113 overlies both the annular and mesh-shape first-type (P-type) region 112 and the intrinsic 111, the mesh-shape defining a boundary between the intrinsic region and the overlying high impurity concentration second-type (N-type) region. Furthermore, an additional second-type (N-type) semiconductor region 114 having high impurity concentration is formed on the lower surface of the intrinsic semiconductor region 111, and the drain electrode D is formed thereon.

The advantages of the vertical junction FET having triode-type dynamic characteristics, as depicted in FIG. 3, will best be understood by comparing the illustrated FET with prior art FET's which generally exhibit pentode-type dynamic characteristics. In general, the apparent conversion conductance gm of a junction FET may be expressed as:

$$gm = Gm/(1 + Rc \cdot Gm)$$

where Gm is the true conversion conductance and Rc is an equivalent internal resistance of the FET between the source and drain electrodes. The resistance Rc is a composite resistance comprised of the resistance between the source electrode and the channel within the FET, the resistance of the channel itself and the resistance between the channel and the drain electrode. In the prior art junction FET the source-to-channel resistance is high, the channel resistance is high because of its narrow and long configuration and the channel-to-drain resistance also is high. Consequently, it should be understood that the resistance Rc in the prior art junction FET is very high. As a result of this high resistance, and as will be seen from the above equation, the apparent conversion conductance gm is essentially equal to the reciprocal of the resistance Rc. Because of this feature, the prior art junction FET exhibits pentode-type dynamic characteristics and, as is apparent therefrom, the drain current becomes saturated as the drain voltage is increased.

In comparison to the previously described prior art junction FET, the FET shown in FIG. 2 is characterized by a relatively small separation between the source electrode S and a channel formed in the P-type region 12 and, additionally, the channel length itself is relatively small. Consequently, the resistance Rc of the vertical junction FET depicted in FIG. 2 is much smaller than the resistance Rc of the prior art FET and the true conversion conductance Gm is high. The product $R_c \cdot Gm$ generally is less than unity. Thus, as is recognized from the above equation, the apparent conversion conductance gm of the vertical junction FET, shown by way of example in FIG. 3, which is used with the present invention, closely approximates the true conversion conductance Gm depending upon the width variation of the depletion layer.

An illustration of the dynamic characteristics exhibited by the FET shown in FIG. 3 is graphically represented in FIG. 4. This graphical representation depicts the relationship between the drain current $I_D$, in milliamps, and the drain voltage $V_D$ in volts. Each individual curve represents the current-voltage relationship for corresponding gate voltage $V_G$ wherein the gate voltage is a variable parameter. It is recognized that the characteristic curves shown in FIG. 4 are analogous to the curves which represent the dynamic characteristics of a conventional triode. Therefore, because the FET is of the type which exhibits triode-type dynamic characteristics, the resistance $R_C$ is substantially constant, even in the environment of voltage variations, and the FET is capable of producing a large output signal having little distortion.

Turning back to FIG. 1, the above FETs 4a and 4b are connected in series to first and second DC voltage sources 8a and 8b which are different in polarity. Between the class A amplifying stage 2 and the gates of the FETs 4a and 4b, there are connected means 5a and 5b for the gate bias of the FETs 4a and 4b, respectively. In general, the means 5a and 5b are resistors, but in the example of FIG. 1, they are batteries as a typical example.

A series connection of resistors Ra and Rb is connected between the output electrodes of the output FETs 4a and 4b, and the connection point between the resistors Ra and Rb or output point 6 is grounded through a speaker 7 having a drive coil 7a which may be a load. As is well known, the DC potential at the output point 6 is equal to the ground potential when the class B amplifying stage 3 operates normally.

In the embodiment of this invention shown in FIG. 1, a detecting means 11, which may detect the variation of the DC potential at the output point 6, is connected to the output point 6 in parallel to the speaker 7. The detecting means 11 is a low pass filter consisting of a resistor 9 and a capacitor 10 connected between the resistor 9 and the ground. An output terminal 12 of the detecting means 11 is connected to a first protective means SW for shunting the output terminal of the class A amplifier 2 and to a second protective means 20 for connecting the output point 6 of the class B amplifying stage to the ground, which protective means will be described later.

The first protective means SW, which shunts the output terminal of the class A amplifier 2, consists mainly of first and second transistors 15 and 16 different in polarity. The bases of the transistors 15 and 16 are connected through first and second resistors 13 and 14 to the output point 12 of the detecting means 11, respectively, their collectors are connected through diodes 17 and 18 to the output terminal of the class A amplifier 2, respectively, and their emitters are grounded, respectively.

Furthermore, a third transistor 19 is provided between the first and second transistors 15 and 16 in such a manner that the emitter (or base) of the transistor 19 is connected to the base of the transistor 15 to form a closed circuit together with the first and second resistors and the base (or emitter) of the transistor 19 is connected to the base of the second transistor 16. Thus, a second protective means 20 connected to the output point 6 is operated with the output signal obtained at the collector of the transistor 19.

The second protective means 20 is a clamp circuit which consists mainly of a fourth transistor 21, four diodes 22a and 22d forming a bridge circuit 22 between the output point 6 and the ground, and a switching element 23 such as a semiconductor controlled rectifier element (SCR) connected between a pair of diagonal points of the bridge circuit 22. The emitter of the fourth transistor 21 is connected to the positive voltage terminal 8a, its base is connected to the collector of the third transistor 19, the collector of the transistor 21 is connected through a resistor 24 to the gate of the switching element such as the SCR 23, and the other pair of diagonal points of the bridge circuit 22 are connected to the output point 6 and to the ground, respectively.

Since the first and second transistors 15 and 16 are of different polarity, when a positive DC voltage is produced at the detecting point 12, the first transistor 15 is made conductive (ON), while when a negative DC voltage is produced at the detecting point 12, the second transistor 16 is made conductive (ON). The third transistor 19 is so connected that when the transistor 15 or 16 becomes ON, a voltage is induced across the resistor 13 or 14, and, when this induced voltage exceeds a predetermined value, the third transistor 19 becomes ON.

The fourth transistor 21 becomes ON as the third transistor 19 becomes ON to supply a current through the emitter-collector path of the fourth transistor 21 to the gate of the SCR 23.

With the circuit explained as above, the signal applied to the input terminal 1 is amplified by the amplifier 2 in class A amplification manner and then amplified by the FETs 4a and 4b in push-pull manner to drive the speaker 7 as in an ordinary one.

If from the A-class amplifying stage or amplifier 2 there is obtained a signal which is unbalanced, for example, is rich in positive signal components, the output FET 4a conducts, which results in a positive DC signal being continuously present at the output point 6. This DC signal component appears as a DC voltage at the detecting point 12 through the detecting means 11 forming the low pass filter. Thus, the transistor 15 conducts with this DC voltage. At this time, since the collector-emitter path of the transistor 15 conducts, the output side of the amplifier 2 is grounded through the diode 17 and the transistor 15. As a result, the supply of the signal to the FET 4a is cut off and hence the production of the DC component at the output point 6 is avoided to protect the speaker 7.

The above describes the situation when the FET 4a primarily conducts. However, in the case where the FET 4b primarily operates, the second transistor 16 conducts to carry out a control similar to above. Thus, the unbalance of the signal caused by the class A amplifying stage 2 is protected by the first protective means SW.

In the case where the class B amplifying stage 3 becomes defective, such as the drain-source of the transistor 4a or 4b becoming short-circuited, a DC voltage appears at the output point 6. In such a case, when the DC voltage is positive, the transistor 15 conducts or when the DC voltage is negative, the transistor 16 conducts and therefore the input signals to FET 4a, b are cut off, as above. However, the above function does not lower the DC voltages at the output point 6 due to a shorted transistor. When the voltage across the resistor 13 or 14 increases due to the supply of the current thereto and the voltage applied across the base-emitter of the transistor 19 exceeds its junction voltage in the forward direction, the transistor 19 conducts. Thus, the transistor 21 conducts and hence a signal is supplied to the gate of the SCR 23 to turn the same ON. As a result, the connection points between the diodes 22a and 22c and between the diodes 22b and 22d are short-circuited to substantially ground the output point 6 and to clamp the signal appearing at the output point 6 to a low value. Thus, the supply of high voltage to the speaker 7 is avoided, and accordingly its damage is prevented. The above describes the circuit function when a positive DC voltage appears at the output point 6, but the same function is carried out when a negative DC voltage appears at the output point 6.

In the embodiment of FIG. 1, the low pass filter 11 serves to pass therethrough an ultralow frequency signal and prevents the first and second transistors 15 and 16 from being operated with the instantaneous DC voltage which is present at the output point 6 when the amplifier 3 operates normally.

According to the invention described above, when a DC voltage appears at the detecting point 12, the first or second transistor 15 or 16 becomes ON to first cut off the supply of the output of the class A amplifying stage 2 to the FETs 4a and 4b, and consequently to avoid the appearance of a DC voltage at the output point 6. As a result, when the operating point of the class A amplifying operation becomes unbalanced and consequently only one of the output transistors 4a and 4b operates the speaker 7 can be protected without short-circuiting the output point 6 and accordingly the reliability as an amplifier is greatly improved. This benefit occurs since the output point 6 is short-circuited (or grounded) for every appearance of a DC voltage, the reliability of the amplifier deteriorates.

If the signal applied to the output transistor 4a or 4b is muted by the transistor 15 or 16 and a DC voltage still appears at the output point 6, the transistors 19 and 21 conduct to thereby make the switching element 23 ON. Thus, the output point 6 is grounded to protect the speaker 7. The switching element 23 can be released from its ON-state by turning the power source OFF once.

FIG. 5 shows the main portion of another embodiment of the invention in which a relay 33 is employed in place of the SCR 23 used in the embodiment of FIG. 1, but the detecting circuit is constructed similar to that of FIG. 1. The other part is substantially same as that of FIG. 1. In the embodiment of FIG. 5, if the DC potential at the output point 6, for example, increases, the transistor 21 (not shown in FIG. 5) conducts and a current flows through a relay coil 33a to close a relay contact 33b to protect the speaker 7.

In the above embodiments, it may be possible that an ordinary bipolar transistor is used for the output transistors 4a and 4b, respectively, and also a relay may be employed in place of the switching transistors 15 and 16 of the first protective means SW.

It may be apparent that many modifications and variations could be effected by one skilled in the art without departing from the spirits or scope of the novel concepts of the present invention.

I claim as my invention:

1. A load protective circuit comprising:
   a. a first voltage source of a first polarity;
   b. a second voltage source of a second polarity;
   c. first and second amplifying elements connected in series between said first and second voltage sources for amplifying input signals derived from an input circuit;
   d. an output point connected between said first and second amplifying elements;

e. a load connected between said output point and ground;
f. means for detecting an undesirable DC voltage appearing at said load so as to produce a control signal;
g. a first protective means for shunting the input signals to ground in response to said control signal when said DC voltage becomes greater than a first predetermined value; and
h. a second protective means connected between said output point and ground for clamping said output point to a predetermined potential in response to said control signal when said DC voltage becomes greater than a second predetermined value which is greater than said first predetermined value.

2. A load protective circuit according to claim 1 in which said means for detecting an undesirable DC voltage is a low pass filter comprising a resistor connected to said output point and a capacitor connected between said resistor and the ground, the output terminal of said low pass filter being connected to said first and second protective means, respectively.

3. A load protective circuit according to claim 2 in which said first protective means comprises first and second transistors connected between said input circuit and ground and a resistor connected between each of the control electrodes of said transistors and the output terminal of said low pass filter.

4. A load protective circuit according to claim 2 in which said second protective means comprises a switching element having an input terminal connected to the output terminal of said low pass filter through switching means which conducts in response to said control signal.

5. A load protective circuit according to claim 4 in which said second protective means further comprises four diodes which are connected between said output point and ground as a bridge said switching element being connected between opposite sides of the bridge.

6. A load protective circuit comprising:
a. a first voltage source of a first polarity;
b. a second voltage source of a second polarity;
c. first and second amplifying elements connected in series between said first and second voltage sources for amplifying input signals derived from an input circuit;
d. an output point connected between said first and second amplifying elements;
e. a load connected between said output point and ground;
f. means for detecting an undesirable DC voltage appearing at said load so as to produce a control signal;
g. a first protective means for shunting the input signals to ground in response to said control signal;
h. a second protective means connected between said output point and ground for clamping said output point to a predetermined potential in response to said control signal;
in which said means for detecting an undesirable DC voltage is a low pass filter comprising a resistor connected to said output point and a capacitor connected between said resistor and the ground, the output terminal of said low pass filter being connected to said first and second protective means, respectively; and
in which said first protective means comprises first and second transistors connected between said input circuit and ground and a resistor connected to the output terminal of said low pass filter and to each of the bases of said first and second transistors, and said second protective means comprises a switching element, a closed circuit formed of said resistors and the base-emitter of a third transistor, and means for connecting the collector of said third transistor of said closed circuit to the input terminal of said switching element.

7. A load protective circuit comprising:
a. a signal drive stage;
b. a power amplifying stage connected to said signal drive stage and comprising first and second amplifying elements for amplifying input signals derived from said signal drive stage, a first voltage source of a first polarity and a second voltage source of a second polarity, said first and second amplifying elements being connected in series between said first and second voltage sources;
c. a speaker having a driving coil, one side of said driving coil being directly connected to an output point of said power amplifying stage and the other side of said driving coil being connected to ground;
d. a low pass filter connected in parallel to said speaker for detecting an undesirable DC voltage appearing at said speaker so as to produce a control signal;
e. first and second transistors connected between said signal drive stage and ground, respectively, and having base electrodes, first and second resistors connected between said low pass filter and the base electrodes of said first and second transistors for applying the control signal to said transistors, whereby said transistors are controlled so as to shunt said input signals in response to said control signal;
f. a third transistor having a base, a collector and an emitter electrode, said base and emitter electrodes being connected in series to said first and second resistors so as to form a closed circuit, whereby said third transistor is operative in response to said control signal; and
g. a switching element connected to said output point and controlled by said third transistor so as to clamp said output point to a predetermined potential when said third transistor conducts.

8. A load protective circuit comprising:
a. a first voltage source of first polarity;
b. a second voltage source of second polarity;
c. first and second amplifying elements connected in series between said first and second voltage sources for amplifying input signals, the connection between said first and second amplifying elements being provided as a DC coupled output for the amplified input signals;
d. a load DC coupled to said output point;
e. control signal means connected to said output point for detecting an undesirable DC voltage appearing at said output point so as to produce a control signal;
f. a first protective means connected to said control signal means for shunting the input signals to ground in response to said control signal when said DC voltage at said output point is greater than a first predetermined value; and
g. a second protective means connected to said first protective means for clamping said output point to a predetermined potential when a substantial DC voltage remains at said output point after said input signal is shunted to ground by said first protective means and when said DC voltage is greater than a second predetermined value which is greater than said first predetermined value.

* * * * *